United States Patent [19]

Weber

[11] 4,248,609
[45] Feb. 3, 1981

[54] METHOD FOR WET SCRUBBING GASES WITH MELTS

[76] Inventor: Ekkehard Weber, Amselweg 6, 4300 Essen 17, Fed. Rep. of Germany

[21] Appl. No.: 28,196

[22] Filed: Apr. 9, 1979

[30] Foreign Application Priority Data

Apr. 10, 1978 [DE] Fed. Rep. of Germany ....... 2815502

[51] Int. Cl.³ ............................................ B01D 47/06
[52] U.S. Cl. ..................... 55/89; 55/257 R; 55/267; 261/78 A; 261/117; 261/151; 261/DIG. 27
[58] Field of Search ................. 55/84, 80, 257 R, 267, 55/89; 261/76, 78 A, 117, 151, 116, DIG. 27, DIG. 75, DIG. 54

[56] References Cited

U.S. PATENT DOCUMENTS

| | | | |
|---|---|---|---|
| 970,654 | 9/1910 | Sepulchre | 55/89 |
| 2,020,850 | 11/1935 | Myhren et al. | 261/DIG. 75 |
| 3,271,969 | 9/1966 | Lorentzen | 261/151 X |
| 3,274,752 | 9/1966 | Huyghe et al. | 55/269 X |
| 3,364,982 | 1/1968 | Jaffe | 261/112 X |
| 3,585,786 | 6/1971 | Hardison | 261/112 X |
| 3,779,913 | 12/1973 | Martin | 261/DIG. 27 |
| 3,885,918 | 5/1975 | Isahaya et al. | 261/78 A X |
| 3,945,804 | 3/1976 | Shang et al. | 261/78 A X |
| 3,969,449 | 7/1976 | Shires et al. | 261/DIG. 27 |
| 4,039,307 | 8/1977 | Bondor | 261/117 X |

FOREIGN PATENT DOCUMENTS

2605249 9/1977 Fed. Rep. of Germany ............. 55/84
821003 9/1959 United Kingdom .................... 261/151

*Primary Examiner*—Richard L. Chiesa
*Attorney, Agent, or Firm*—Herbert L. Lerner

[57] ABSTRACT

Wet scrubbing gases containing undesirable constituents by passing the gases at a temperature above 500K. in contact with the melt of an inorganic substance to remove the undesirable constituents. The melt together with a portion of the purified gas as a propellant is introduced into a binary nozzle to atomize the melt into fine particles which contact the gases to be purified.

2 Claims, 2 Drawing Figures

METHOD FOR WET SCRUBBING GASES WITH MELTS

BACKGROUND OF THE INVENTION

1. Field of the Invention

This invention relates to a method for wet scrubbing gases containing undesirable constituents at elevated temperature, above 500K, with melts of inorganic substances to remove the undesirable constituents from the gases.

2. Background of the Invention

It is known to use wet scrubbers for scrubbing gases containing impurities, especially gases which have no oxidizing properties, at which elevated temperatures above 300° C. must be maintained, to remove impurities from the gases. Metal melts and in particular melts of tin or tin alloys, for instance, have been suggested as scrubbing liquids. It has also been proposed to use inorganic salt melts for this purpose. Since effectiveness of separation depends on the droplet size of the scrubbing fluid, it has been proposed in German Published Prosecuted Application DT-AS No. 26 05 249 to use the known venturi scrubber for scrubbing the gas with such melts. It has now been found that the required fineness of the droplets is difficult to achieve because the density of the melt is high as compared to water and because of the different surface tension conditions.

SUMMARY OF THE INVENTION

An object of the present invention is to provide a method for scrubbing gases containing impurities with a melt to remove the impurities, and particularly to atomize such melts sufficiently finely to obtain improved separation and efficiency.

With the foregoing and other objects in view, there is provided in accordance with the invention, a method for wet scrubbing gases containing undesirable constituents by passing the gases in a vessel at an elevated temperature above 500K in contact with a melt of an inorganic substance, to remove the undesirable constituents from the gases and discharging the purified gases, including introducing the melt prior to contact with the gases into a binary nozzle together with a portion of the purified gases as a propellant for the melt through the binary nozzle to atomize the melt, and passing the atomized melt in intimate contact with the gases to remove the undesirable constituents therefrom.

Other features which are considered as characteristic for the invention are set forth in the appended claims.

Although the invention is illustrated and described herein as embodied in a method for wet scrubbing gases with melts, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Atomizing of the melt is performed in a binary nozzle know per se, which in combination with the purified gases as the propellant achieves the necessary fineness of the droplets of the melt. In a further embodiment this propellant gas taken from the scrubbed gas stream is compressed in a compression stage to increase its pressure to propel the melt through the nozzle and atomize the melt into fine particles.

Figure 1:
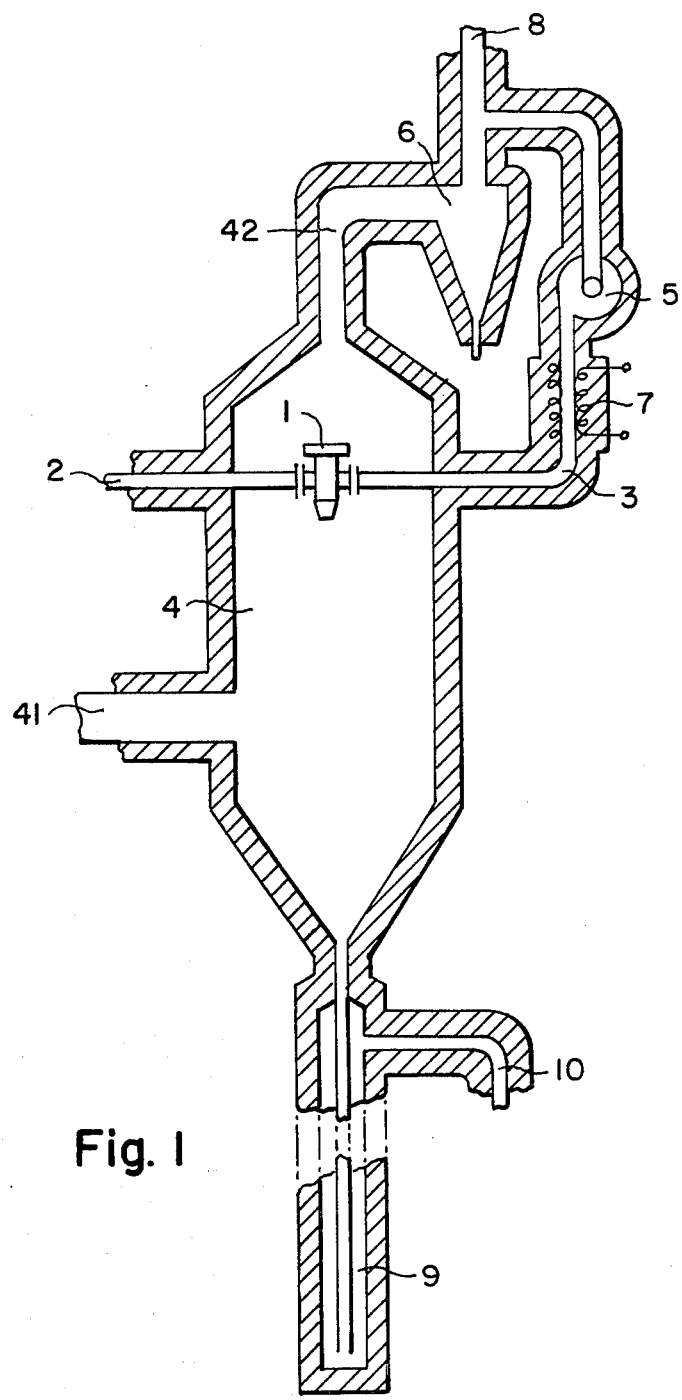
FIG. 1 diagrammatically illustrates one method of carrying out the operation in accordance with the invention.
Figure 2:
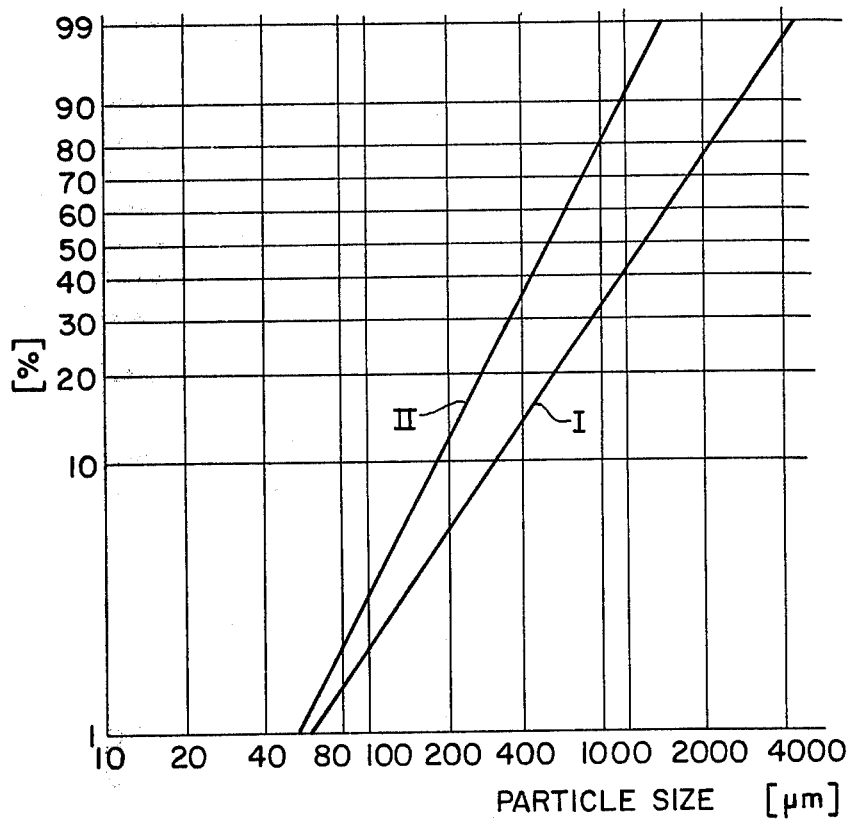
FIG. 2 is a comparison of droplet sizes of the melt when atomized in accordance with the invention from a binary nozzle (Curve II) as compared distribution from solid-cone nozzle (Curve I).

In FIGS. 1 and 2, the invention is explained in greater detail. FIG. 1 schematically shows the method of the invention. FIG. 2 is a comparison of attainable droplet sizes; metallic tin was atomized as an example for other molten inorganic substances.

Referring to FIG. 1, raw gases which may be the usual industrial gases containing impurities desired to be removed, is introduced through inlet 41 into scrubber tower 4, which is a vertical elongated vessel. A binary nozzle 1 with the inlet for the melt 2 and the inlet for the compressed gas 3 is disposed in scrubber tower 4 at an elevation above raw gas inlet 41. Although only a single nozzle 1 is shown in the drawing, several nozzles 1 may be employed in scrubber 4. The raw gases containing the inpurities entering scrubber tower 4 through inlet 41 flow upwardly countercurrent to and in intimate contact with atomized droplets of melt issuing from binary nozzle 1, which melt removes impurities from the gases. The purified gases continue their upward passage in scrubber tower 4, exiting from the top of tower 4 through conduit 42. The purified gases flowing through conduit 42 may contain entrained or suspended liquid droplets and are therefore sent to a droplet separator chamber 6 where the droplets drop to the bottom and the purified gases continue on discharging through outlet 8. A portion of the scrubbed gas leaving the droplet separator 6 is diverted to the suction side of compressor 5, which increases the gas pressure and returns the purified gas under higher pressure to the binary nozzle 1. Interposed in line 3 through which the compressed purified gas is discharged is a heating device 7 to raise the temperature of the compressed gas. In general, however, the temperature increase due to the compression heat will be sufficient to keep the temperature of the compressed gas high enough above the melting point of the melt used for scrubbing the gas so that cooling of the melt will not occur. The melt, loaded with the washed-out impurities flows from the scrubber 4 to a discharge line 10 via a syphon trap 9, the height of the syphon being determined by the gas pressure. Heat insulation is indicated by hatching. The heat insulation shown in the drawing can be replaced by a double jacket which is insulated on the outside and through which the scrubbed gas may flow. This prevents undesired solidification of the melt and thereby, caking at the wall.

FIG. 2 shows the particle size of the tin dust produced after cooling in a graph of grain size. Curve I was obtained with a solid-cone nozzle. The initial pressure of the melt was 12 bar. Curve II shows in the same graph of grain size the analogous particle size distribution for a binary nozzle, in which the initial melt pressure was 2.5 bar and the initial gas pressure 5 bar overpressure. The steeper slope of Curve II shows the advantage of the procedure according to the invention. With the size of the finest particles nearly the same, the overall particle fineness is greater; the mean particle size is 0.53 mm as compared to 1.3 mm. This result is the more surprising as the atomizing energy which is often considered as a measure for the attainable fineness, is higher in the single-substance nozzle than in the binary nozzle using two substances. In the procedure according to the invention, power can therefore be saved; nevertheless even with lower power consumption, a finer spectrum of particle sizes is obtained.

There are claimed:

1. In a continuous method for wet scrubbing gases containing undesirable constitutents by continuously passing the gases in a vertical scrubbing vessel at an elevated temperature above 500 K in contact with a melt of a metal or an inorganic metal compound which is substantially non-vaporizable under the conditions of operation, to remove the undesirable constituents from the gases and continuously discharging the purified gases, the improvement comprising compressing a portion of the purified gases to increase its pressure above the pressure of the melt and to raise its temperature above the temperature of the melt, introducing the melt prior to contact with the gases into a binary nozzle together with a potion of the purified gases which had been compressed to increase its temperature and pressure as a propellant for the melt through the binary nozzle to atomize the melt, and passing the atomized melt downwardly, countercurrent to and in intimate contact with the upwardly flowing gases to remove the undesirable constituents therefrom and recycling a portion of the thus purified gases as said propellant for the melt through the binary nozzle to atomize the melt.

2. In a method for wet scrubbing gases containing undesirable constituents at an elevated temperature above 500 K with a melt of a metal or an inorganic metal compound which are substantially non-vaporizable under the conditions of operation to remove the undesirable constituents by continuously passing the gases into a vertical scrubbing vessel, contacting them with the atomized melt, and continuously discharging the purified gases, the improvement comprising recycling a portion of the purified gases, compressing a portion of the purified gases to increase its pressure above the pressure of the melt, passing the portion of the purified gases through a heating device to increase its temperature above the temperature of the melt, introducing the melt prior to contact with the gases to be scrubbed into a binary nozzle together with the portion of the recycled purified gases uner compression and increased pressure, as the propellant for atomizing the melt, and passing the melt downwardly, counter-current to and in intimate contact with the upwardly flowing gases to remove the undesirable constituents therefrom and recycling a portion of the thus purified gas as said propellant for the melt through the binary nozzle to atomize the melt.

* * * * *